(12) United States Patent
Sano et al.

(10) Patent No.: US 6,676,738 B2
(45) Date of Patent: Jan. 13, 2004

(54) BLACK INK COMPOSITION, INK SET, RECORDING METHOD, RECORDING MATTER AND INK JET RECORDING DEVICE

(75) Inventors: Tsuyoshi Sano, Nagano-ken (JP); Kiyohiko Takemoto, Nagano-ken (JP)

(73) Assignee: Seiko Epson Corporation ( * ) Notice: Subject to any disclaimer, the term of this patent is extended or adjusted under 35 U.S.C. 154(b) by 60 days.

(21) Appl. No.: 10/034,635

(22) Filed: Dec. 28, 2001

(65) Prior Publication Data

US 2002/0130936 A1 Sep. 19, 2002

(30) Foreign Application Priority Data

Dec. 28, 2000 (JP) ................................. P.2000-403299
Dec. 27, 2001 (JP) ................................. P.2001-398534

(51) Int. Cl.[7] .......................... C09D 11/00; C09D 11/02
(52) U.S. Cl. .................. 106/31.75; 106/31.86; 106/31.89
(58) Field of Search ................. 106/31.75, 31.86, 106/31.89; 347/100

(56) References Cited

U.S. PATENT DOCUMENTS

| 5,803,958 A | 9/1998 | Katsen et al. ............ 106/31.65 |
| 6,451,100 B1 * | 9/2002 | Karl et al. ................. 106/31.9 |
| 2003/0056687 A1 * | 3/2003 | Sano .......................... 106/31.6 |

FOREIGN PATENT DOCUMENTS

| EP | 0899311 | 3/1999 |
| EP | 0902061 | 3/1999 |
| EP | 1138728 | 4/2001 |
| JP | 5155004 | 6/1993 |
| JP | 5155006 | 6/1993 |
| JP | 256590 | 9/2000 |

* cited by examiner

*Primary Examiner*—Helene Klemanski
(74) *Attorney, Agent, or Firm*—Ladas & Parry

(57) ABSTRACT

Disclosed is a black ink composition containing a carbon black and a pigment represented by the following general formula (1):

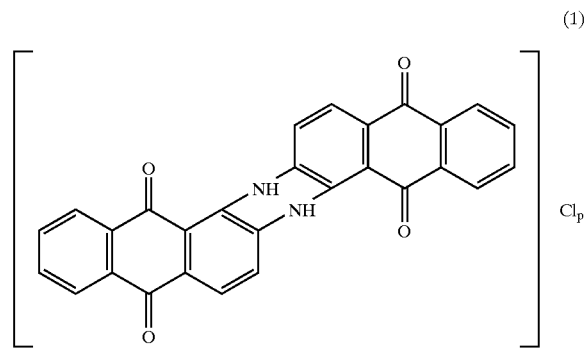

wherein p represents an integer of from 0 to 3. Also disclosed is an ink set containing at least one kind of such a black ink composition as at least one of a black ink composition and a light black ink composition.

18 Claims, 1 Drawing Sheet

BLACK INK COMPOSITION, INK SET, RECORDING METHOD, RECORDING MATTER AND INK JET RECORDING DEVICE

FIELD OF THE INVENTION

The present invention relates to a black ink composition and an ink set, and further relates to a recording method using the same, recorded matter obtained using the same, and an ink jet recording device using the same.

BACKGROUND OF THE INVENTION

In the case where an image is formed by an ink jet recording method or the like, there may be used an ink set comprising a light black ink for the purpose of obtaining a high quality image. For example, to a four-color ink set comprising a black ink, a cyan ink, a magenta ink and a yellow ink (or a six-color ink set further comprising a light cyan ink and a light magenta ink added to the four-color ink set) may be added a light black ink to make a five-color ink set (or seven-color ink set). The light black ink has a lower carbon black concentration than that of the black ink and is used for the purpose of improving the color reproducibility with respect to dark color such as shadow area or improving the gradation of gray.

However, since the light black ink (i.e., thin black ink) has a low pigment content, the resulting color hue is tinted rather than anchromatically colored which state is originally necessary. In other words, the light black ink deviates from (a*, b*) of (0, 0) in the L*a*b* space. In some detail, the light black ink is tinted with yellow. In order to modify the yellowing property of carbon black, it is necessary that a color compensator (i.e., pigment) complementary to yellow be used. In the case where the pigment complementary to yellow is selected from organic pigments, it is necessary that discoloration by air oxidation or light-resistance be taken into account.

For example, U.S. Pat. No. 5,803,958 discloses a black pigment ink composition comprising a cyan pigment and a magenta pigment in addition to a carbon black. The above cited U.S. Pat. No. 5,803,958 discloses a black ink composition comprising Pigment Blue 15:3 as a cyan pigment and Pigment Red 122 as a magenta pigment. The use of this black ink composition as a light black ink composition makes it possible to suppress the foregoing yellowing property. However, the foregoing Pigment Blue 15:3 and Pigment Red 122 were disadvantageous in that the yellowability of carbon black may be emphasized with time contrarily.

SUMMARY OF THE INVENTION

An object of the present invention is to provide means that can eliminate the defects of light black ink compositions according to the related art technique even stably with time to modify the yellowing property of carbon black.

Other objects and effects of the present invention will become apparent from the following description.

As a result of the extensive studies made by the present inventors, it was found that the use of a specific blue pigment as a complementary color makes it possible to obtain a black ink composition which exhibits a good tint and an excellent light-resistance and can withstand discoloration due to air oxidation. The black ink composition can be used as a light black ink composition to eliminate the defects of the related art technique even stably with time. The black ink composition can also be suitably used as usual black ink (ink having a high carbon black concentration).

The inventors further found that an ink set comprising a plurality of light black ink compositions wherein the comparison of any two black ink compositions contained therein shows that the ratio of the concentration of the specific pigment to the concentration of carbon black in the black ink composition having a lower carbon black concentration (e.g., light black ink composition) is higher than the ratio of the concentration of the specific pigment to the concentration of carbon black in the black ink composition having a higher carbon black concentration (e.g., black ink composition) can form a gray scale which is modified in yellowing property even stably with time.

The invention is based on the above-described findings.

That is, the above-described objects of the present invention have been achieved by providing the followings.

1) A black ink composition comprising a carbon black and a pigment represented by the following general formula

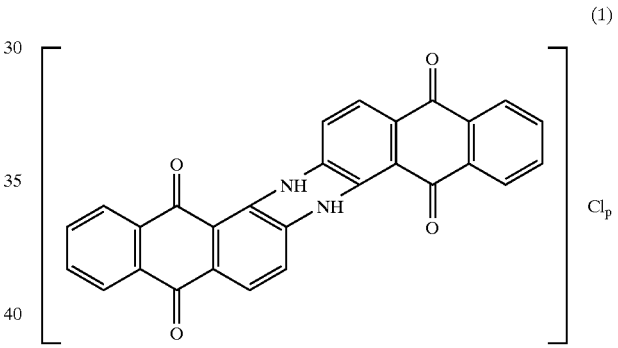

wherein p represents an integer of from 0 to 3.

2) The black ink composition according to item 1) above, which is aqueous.

3) The black ink composition according to item 1 or 2 above, further comprising at least one of an anionic surfactant, a nonionic surfactant and an amphoteric surfactant.

4) The black ink composition according to item 3) above, wherein said nonionic surfactant is an acetylene glycol-based surfactant.

5) The black ink composition according to any one of items 1) to 4) above, further comprising a water-soluble organic solvent.

6) An ink set comprising, as a black ink composition or a light black ink composition, a black ink composition comprising a carbon black and a pigment represented by the following general formula (1):

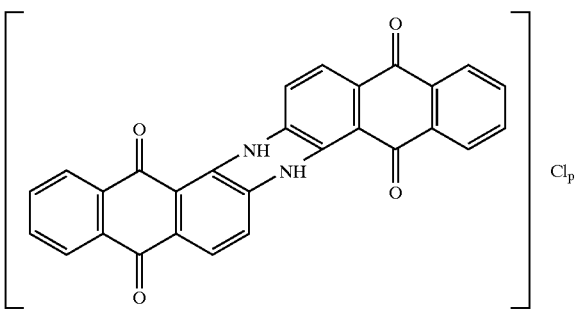

(1)

wherein p represents an integer of from 0 to 3.

7) The ink set according to item 6) above, comprising a plurality of black ink compositions each comprising a carbon black and a pigment of formula (1), wherein the plurality of black ink compositions have different carbon black concentrations from one another, and wherein any two of the plurality of black ink compositions satisfy the following relationship (2):

$$P1/K1 > P2/K2 \qquad (2)$$

wherein P1 and K1 represent the concentrations of the pigment of formula (1) and of the carbon black, respectively, in the black ink composition having a lower carbon black concentration between the two black ink compositions, and P2 and K2 represent the concentrations of the pigment of formula (1) and of the carbon black, respectively, in the black ink composition having a higher carbon black concentration between the two black ink compositions.

8) The ink set according to item 7) above, wherein said black ink compositions comprising a carbon black and a pigment of formula (1) includes a light black ink composition and a black ink composition.

9) The ink set according to any one of items 6) to 8) above, which is aqueous.

10) A recording method comprising:

ejecting a droplet of an ink composition so that said droplet is attached to a recording medium to effect printing, wherein said ink composition is a black ink composition according to any one of items 1) to 5) above or is a constituent of an ink set according to any one of items 6) to 9) above.

11) Recorded matter obtained by printing in accordance with a recording method according to item 10) above.

12) An ink jet recording device comprising an electrostrictive element capable of oscillating according to electrical signal and being arranged such that the oscillation of said electrostrictive element causes ejection of a black ink composition, wherein said ink composition is a black ink composition according to any one of items 1) to 5) above or is a constituent of an ink set according to any one of items 6) to 9) above.

DETAILED DESCRIPTION OF THE INVENTION

Figure 1:
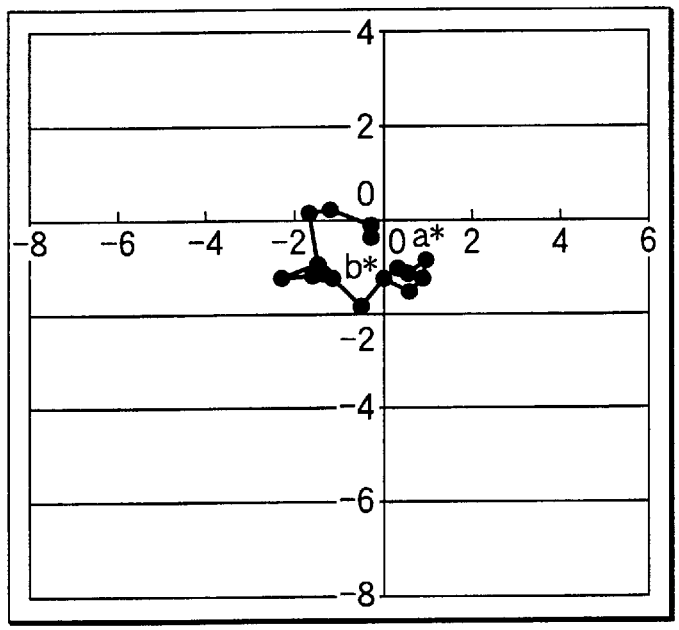
FIG. 1 is a graph showing the coordinates of a* and b* in the L*a*b* color specification system of the gray scale produced using a black ink set according to the present invention.

The pigment represented by general formula (1) to be contained in the black ink composition according to the invention is a blue pigment. Among these compounds, one wherein p is 0 is known as Color Index Pigment Blue 60 (C.I. PB60).

The black ink composition of the invention may comprise as a carbon black one prepared by any known method such as contact method, furnace method and thermal method. Examples of the carbon black employable herein include No. 2300, No. 900, MCF88, No. 33, No. 40, No. 45, No. 52, MA7, MA8, MA100 and No. 2200B (produced by Mitsubishi Chemical Corporation), Raven 5750, Raven 250, Raven 5000, Raven 3500, Raven 1255 and Raven 700 (produced by Columbian Carbon Inc.), Regal 400R, Regal 330R, Regal 660R, Mogul L, Monarch 700, Monarch 800, Monarch 880, Monarch 900, Monarch 1000, Monarch 1100, Monarch 1300 and Monarch 1400 (produced by Cabot Specialty Chemicals Inc.), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 (produced by Degssa Inc.).

The ratio of the amount of the carbon black contained in the black ink composition of the invention to the blue pigment (particularly C. I. PB60) represented by general formula (1) is not particularly limited. It only requires that the blue pigment be contained in an amount such that the yellowing property of individual carbon blacks used can be modified. In order to determine the content of these components specifically, the recorded image formed by an ink composition comprising the carbon black and blue pigment in a predetermined proportion is measured for percent change of color exposed to ozone atmosphere to evaluate its yellowing property. Taking into account the evaluation result, the proportion of these components can be adjusted so as to properly modify the yellowing property.

Except for containing the blue pigment (particularly C.I. PB60), the black ink composition of the invention can comprise the same constituents as in the conventional known black ink composition. The black ink composition of the invention can be prepared to form an organic ink, preferably an aqueous ink. The black ink composition of the invention can be used as an ink for various known recording methods, preferably for ink jet recording method.

Hereunder, the invention will be briefly described with reference to the case where the black ink composition of the invention is an aqueous ink composition for ink jet recording method.

In the black ink composition for ink jet recording method of the invention, the carbon black and the above-described blue pigment (particularly C.I. PB60) are preferably added in the form of a pigment dispersion, e.g., in an aqueous medium with a dispersant.

The aqueous black ink composition for ink jet recording method of the invention preferably comprises the carbon black in an amount of from 1 to 10 parts by weight, more preferably from 1.5 to 5 parts by weight based on the total weight of the ink composition. The aqueous black ink composition for ink jet recording method of the invention preferably comprises the blue pigment (particularly C.I. PB60) in an amount of from 0.05 to 1.5 parts by weight, more preferably from 0.1 to 1 parts by weight per 1 part by weight of the carbon black. When the content of the blue pigment falls below 0.05 parts by weight per 1 part by weight of the carbon black, the light black recorded area has a remarkable yellowish tint. On the contrary, when the content of the blue pigment exceeds 1.5 parts by weight per 1 part by weight of the carbon black, blue tint is prominent particularly in the dark black recorded area and light black recorded area, thus not being preferred.

The particle diameter of the carbon black is preferably not greater than 10 $\mu$m, more preferably not greater than 0.1 $\mu$m. Similarly, the particle diameter of C.I. PB60 is preferably not greater than 10 $\mu$m, more preferably not greater than 0.1 $\mu$m.

The aqueous black ink composition for ink jet recording method of the invention may further comprise a surfactant. Specific examples of the surfactant employable herein include anionic surfactants (e.g., sodium dodecylbenzenesulfonate, sodium laurate, ammonium salt of polyoxyethylene alkyl ether sulfate), nonionic surfactants (e.g., polyoxyethylene alkyl ether, polyoxyethylene alkyl ester, polyoxyethylenesorbitanaliphatic acid ester, polyoxyethylene alkyl phenyl ether, polyoxyethylenealkylamine, polyoxyethylene alkyl amide), and amphoteric surfactants (e.g., N,N-dimethyl-N-carboxymethylammonium betain, N,N-dialkylaminoalkylenecarboxylate, N,N-dialkyl-N,N-bispolyoxyethyleneammonium nitrate ester betain, 2-alkyl-1-carboxymethyl-1-hydroxyethylimidazolinium betain). These surfactants may be used singly or in combination of two or more thereof.

The black ink composition of the invention preferably comprises an acetylene glycol-based surfactant. The incorporation of such an acetylene glycol-based surfactant makes it possible to improve the penetrating power of the ink composition with respect to the recording medium. Thus, printing with little blurring can be expected in various recording media. Specific examples of the acetylene glycol-based surfactant to be incorporated in the black ink composition of the invention include a compound represented by the following general formula (2):

[ka-4]

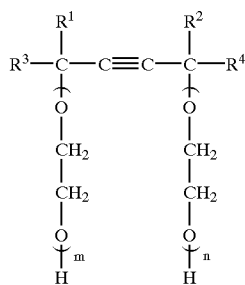

(2)

wherein m and n satisfy the relationship $0 \leq m+n \leq 50$; and $R^1$, $R^2$ and $R^3$ each independently represent an alkyl group, preferably an alkyl group having 6 or less carbon atoms.

Preferred among the compounds represented by general formula (2) are 2,4,7,9-tetramethyl-5-decyne-4,7-diol, 3,6-dimethyl-4-octyne-3,6-diol, and 3,5-dimethyl-1-hexyne-3-ol. As the acetylene glycol-based surfactant there may be used a commercially available product. Specific examples of such a commercially available product include Surfynol 104, 82, 465, 485 and TG (produced by Air Products and Chemicals, Inc.), and Orfin STG and Orfin E1010 (produced by Nissin Chemical Industry Co., Ltd.).

The amount of the surfactant to be incorporated in the aqueous black ink composition for ink jet recording method of the invention is not particularly limited but preferably is from 0.01 to 10% by weight, more preferably from 0.1 to 5% by weight. When the amount of the surfactant falls below 0.01% by weight, a sufficient surface activating effect cannot be obtained. On the contrary, when the amount of the surfactant exceeds 10% by weight, it may cause precipitation of crystal, formation of liquid crystal or pigment's stability deterioration, which brings about ejection failure.

In the invention, the pigment is dispersed in the ink composition with a dispersant for dispersing pigments.

In a preferred embodiment of the invention, these pigments are preferably incorporated in the ink in the form of a pigment dispersion obtained by dispersing the pigment in an aqueous medium with a dispersant.

As the dispersant for use in the invention there may be suitably used a conventional surfactant or a dispersant which is commonly used to prepare a pigment dispersion, such as polymer dispersant. It will be apparent to those skilled in the art that the dispersant contained in the pigment dispersion also acts as a dispersant for the ink composition and as a surfactant.

As a preferred dispersant there may be used a polymer dispersant, particularly a resin dispersant.

Preferred examples of such a polymer dispersant include natural polymers. Specific examples of the natural polymers include protein such as glue, gelatin, casein and albumin, natural rubber such as gum arabic and tragacanth gum, glucocide such as saponin, alginic acid derivative such as alginic acid, alginic acid propylene glycol ester, triethanolamine alginate and ammonium alginate, and cellulose derivative such as methyl cellulose, carboxymethyl cellulose, hydroxyethyl cellulose and ethylhydroxy cellulose.

Other preferred examples of the polymer dispersant include synthetic polymers. Specific examples of the synthetic polymers include polyvinyl alcohols, polyvinyl pyrrolidones, acrylic resins such as polyacrylic acid, acrylic acid-acrylonitrile copolymer, acrylate-acrylonitrile copolymer, vinyl acetate-acrylic acid ester copolymer and acrylic acid-acrylic acid ester copolymer, styrene-acryl resins such as styrene-acrylic acid ester copolymer, styrene-methacrylic acid copolymer, styrene-methacrylic acid copolymer, styrene-α-methylstyrene-acrylic acid copolymer and styrene-α-methylstyrene-acrylic acid-acrylic acid ester copolymer, styrene-maleic acid copolymer, styrene-maleic anhydride copolymer, isobutylene-maleic acid resin, rosin-modified maleic acid resin, vinyl naphthalene-acrylic acid copolymer, vinyl naphthalene-maleic acid copolymer, vinyl acetate copolymers such as vinyl-ethylene copolymer, vinyl acetate-aliphatic acid vinyl ethylene copolymer, vinyl acetate-maleic acid ester copolymer, vinyl acetate-crotonic acid copolymer and vinyl acetate-acrylic acid copolymer, and salt thereof.

Preferred among these dispersants are styrene-acrylic acid copolymers, styrene-methacrylic acid copolymers, acrylic acid-acrylic acid ester copolymers, and styrene-maleic anhydride copolymers.

As the resin dispersant there may be used a commercially available product. Specific examples of such a commercially available resin dispersant include Johncryl 68 (molecular weight: 10,000; acid value: 195), Johncryl 61J (molecular weight: 10,000; acid value: 195), Johncryl 680 (molecular weight: 39,000; acid value: 215), Johncryl 682 (molecular weight: 1,600; acid value: 235), Johncryl 550 (molecular weight: 7,500; acid value: 200), Johncryl 555 (molecular weight: 5,000; acid value: 200), Johncryl 586 (molecular weight: 3,100; acid value: 105), Johncryl 683 (molecular weight: 7,300; acid value: 150), and Johncryl B-36 (molecular weight: 6,800; acid value: 250) (produced by JOHNSON POLYMER CORPORATION).

The aqueous black ink composition for ink jet recording method of the invention may comprise a water-soluble organic solvent as a swelling agent, drying speed adjustor and/or stabilizer. The amount of the water-soluble organic solvent to be incorporated in the respective ink composition is preferably from about 0.5 to 40% by weight, more preferably from 2 to 30% by weight based on the total weight of the ink composition.

As the water-soluble organic solvent there may be used a water-soluble organic solvent which is incorporated in an ordinary aqueous pigment ink composition. Specific examples of such a water-soluble organic solvent include polyvalent alcohols such as ethylene glycol, diethylene glycol, triethylene glycol, tetraethylene glycol, polyethylene glycol, polypropylene glycol, propylene glycol, dipropylene glycol, butylene glycol, 1,2,6-hexanetriol, thioglycol, hexylene glycol, glycerin, trimethylolethane and trimethylolpropane, polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether, 2-pyrrolidone, N-methyl-2-pyrrolidone, 1,3-dimethyl-2-imidazolidinone, and triethanolamine.

The black ink composition of the invention preferably further comprises a preservative, a metal ion capturing agent and/or rust preventive. As the preservative there is preferably used at least one compound selected from the group consisting of alkyl isothiazolone, chloroalkyl isothiazolone, benzisothiazolone, bromonitroalcohol, oxazolidine-based compound and chloroxylenol. As the metal ion capturing agent there is preferably used an ethylenediaminetetraacetate. As the rust preventive there is preferably used dicyclohexylammonium nitrate and/or benzotriazole.

The black ink composition of the invention may further comprise additives such as swelling agent, humectant, dissolving aid, penetration inhibitor, viscosity adjustor, pH controller, oxidation inhibitor, mildewproofing agent, corrosion inhibitor and other metal ion capturing agents incorporated therein for the purpose of securing storage stability, inhibiting clogging and securing ejection stability.

Examples of components for improving the solubility of ink components, improving the penetrating power of the ink with respect to the recording medium such as paper or inhibiting the clogging of the nozzle, include alkylalcohols having from 1 to 4 carbon atoms such as ethanol, methanol, butanol, propanol and isopropanol, formamide, acetamide, dimethyl sulfoxide, sorbit, sorbitan, acetyne, diacetyne, triacetyne, and sulfolan. These components may be properly selected and used.

Further, pH controllers, amines such as diethanolamine, triethanolamine, propanolamine and morpholine, modification product thereof, inorganic hydroxides such as potassium hydroxide, sodium hydroxide and lithium hydroxide, carbonates such as ammonium hydroxide, quaternary ammonium salts (e.g., tetramethylammonium), potassium carbonate, sodium carbonate and lithium carbonate, and phosphates may be used.

Other examples of additives employable herein include ureas such as urea, thiourea and tetramethylurea, alohanates such as alohanate and methyl alohanate, burettes such as burette, dimethyl burette and tetramethyl burette, L-ascorbic acid, salt thereof, commercially available oxidation inhibitors, and ultraviolet absorbers.

The black ink composition of the invention preferably has a surface tension of not greater than 45 mN/m, more preferably from 25 to 45 mN/m. When the surface tension of the black ink composition of the invention exceeds 45 mN/m, the resulting print cannot be fairly dried, causing ink blurring resulting in color bleed or the like and hence making it difficult to provide a good printed image. On the contrary, when the surface tension of the black ink composition of the invention falls below 25 mN/m, the periphery of the nozzle in the printer head can easily wet, causing the flying of the ink droplet to be curved, easily deteriorating the ejection stability. The surface tension of the black ink composition of the invention can be measured by means of a surface tensiometer which is commonly used.

The surface tension of the ink composition can be set to the above-defined range by adjusting the kind and proportion of various components constituting the ink composition.

The aqueous black ink composition for ink jet recording method of the invention can be prepared by an ordinary method.

The black ink composition of the invention can be advantageously used in an ink set. Thus, the invention also relates to an ink set.

The ink set of the invention may be an ink set for monochromatic recording or an ink set for color recording.

The ink set for monochromatic recording of the invention comprises at least one of black ink and light black ink. As the at least one of the black ink and light black ink there may be used the black ink composition of the invention described above.

The kind and number of ink compositions constituting the color recording ink set of the invention are not particularly limited so far as the black ink composition of the invention is incorporated as a constituent of ink set. Representative examples of the invention include four-color ink set comprising yellow, cyan, magenta and black inks, six-color ink set comprising yellow, cyan, magenta, black, light cyan and light magenta inks, seven-color ink set comprising yellow, cyan, magenta, black, light cyan, light magenta and dark yellow inks, seven-color ink set comprising yellow, magenta, cyan, black, light black, light magenta and light cyan inks, seven-color ink set comprising yellow, cyan, magenta, black, red, green and blue inks, seven-color ink set comprising yellow, cyan, magenta, black, orange, green and blue inks, and seven-color ink set comprising yellow, magenta, cyan, black, orange, green and violet inks.

The term "light black ink composition" as used herein means a black ink composition having a lowered pigment (i.e., carbon black) concentration for the purpose of improving the color reproducibility with respect to dark color such as shadow area and improving the gray gradation to reduce granularity. The term "light magenta and light cyan ink compositions" as used herein means, respectively, magenta ink composition and cyan ink composition having a lowered coloring material concentration for the purpose of improving the quality of printed image by concentration fluctuation. The term "dark yellow ink composition" as used herein means a yellow ink composition which comprises a coloring material (pigment) having a lower brightness and saturation than ordinary yellow ink composition for the purpose of improving the color reproducibility with respect to dark color such as shadow area. The term "red, orange, green, blue and violet ink compositions" as used herein means ink compositions which are used as an element for constituting halftone of yellow, magenta and cyan to improve the color reproduction range.

A preferred embodiment of the ink set of the invention comprises a carbon black-containing light black ink composition in which C.I. PB60 is incorporated. Since the light black ink composition has a lowered carbon black concentration, the incorporation of C. I. PB60 makes it possible to modify the yellowing property of light color area (gray area) such as shadow area even stably with time.

In the ink set comprising the carbon black-containing light black ink composition having the blue pigment (particularly C.I. PB60) incorporated therein, a carbon black-containing black ink composition, which may be used in combination with the light black ink composition, may be either an ink composition containing the blue pigment or an ink composition free of the blue pigment.

The ink set of the invention may comprise a plurality of black ink compositions (The term "black ink composition" as used herein is meant to include not only black ink compositions but also light black ink compositions.) having different carbon black concentrations incorporated therein. In an embodiment, the blue pigment (particularly C.I. PB60) may be added to two or more of these black ink compositions. In the ink set according to such an embodiment, it is preferred that the comparison of any two black ink compositions contained in the ink set show that the ratio (P1/K1) of the concentration (P1) of the blue pigment of formula (1) to the concentration (K1) of carbon black in the black ink composition having a lower carbon black concentration and the ratio (P2/K2) of the concentration (P2) of the blue pigment of formula (1) to the concentration (K2) of carbon black in the black ink composition having a higher carbon black concentration satisfy the following relationship (2):

$$P1K1 > P2/K2 \qquad (2)$$

In other words, the lower the carbon black concentration of the black ink composition is, the greater is the tendency for yellowing. Therefore, the necessity of the blue pigment to be added to modify the yellowing property increases. However, since the carbon black concentration itself is relatively low, the absolute amount of the blue pigment required to modify the yellowing property does not necessarily increase. The factor that must increase is the ratio of the concentration of the blue pigment to be added to the concentration of the carbon black.

By thus adjusting the amount of the blue pigment in the ink set of the invention comprising a plurality of black ink compositions having different carbon black concentrations incorporated therein, the yellowing property of the light color area (gray area) such as shadow area can be modified even stably with time. Further, the use of the monochromatic color ink set of the invention comprising a plurality of black ink compositions having different carbon black concentrations incorporated therein makes it possible to prepare an excellent gray scale.

The ink set of the invention may have the same constitution as the conventional ink set except that a black ink composition comprises the blue pigment and carbon black. Thus, the ink set of the invention may be used for various known recording methods. The ink set of the invention is preferably aqueous, particularly an ink set for ink jet recording method.

The recording method of the invention is a recording method which comprises ejecting a droplet of an ink composition so that it is attached to the recording medium to effect printing. The recording method of the invention involves the use of the black ink composition of the invention and/or the ink set of the invention. The recording method of the invention can be suitably accomplished by mounting an ink cartridge containing the black ink composition of the invention (or ink cartridges containing various black ink compositions respectively in the case of an embodiment where the ink set comprising a plurality of black ink compositions is used) in a known ink jet recording device and performing printing with respect to a recording medium.

The ink jet recording device for use in the invention is preferably an ink jet recording device comprising an electrostrictive element which can oscillate according to electrical signal and which is arranged such that the oscillation of the electrostrictive element causes ejection of the black ink composition of the invention or of an ink constituting the ink set of the invention.

As the ink cartridge (containing case) for containing the black ink composition therein, a known ink cartridge can be suitably used.

The recorded matter of the invention is obtained by printing in accordance with the recording method of the invention. Therefore, the yellowing property of the carbon black can be modified. Accordingly, an image which exhibits good tint and excellent light-resistance and can withstand discoloration by air oxidation can be provided on the recorded matter of the invention.

EXAMPLES

The present invention will be illustrated in greater detail with reference to the following Examples, but the invention should not be construed as being limited thereto.

Examples 1 to 4

The components set forth in Table 1 below were blended, and then subjected to dispersion with glass beads (diameter: 1.7 mm; amount: 1.5 times (by weight) that of the mixture) in a sand mill (produced by Yasukawa Seisakusyo Co., Ltd.) for 2 hours to obtain ink compositions of Examples 1 to 4. As the water-soluble resin there was used a styrene-acrylic acid copolymer (molecular weight: 15,000; acid value: 100).

TABLE 1

| | Example Nos. | | | |
|---|---|---|---|---|
| | 1 | 2 | 3 | 4 |
| Carbon black | 2.5 | 1.3 | 0.3 | 0.7 |
| C. I. Pigment Blue 60 | 0.2 | 0.5 | 0.2 | 0.4 |
| Water-soluble resin (dispersant) | 1.1 | 0.7 | 0.2 | 0.4 |
| Glycerin | 12 | 16 | 20 | 20 |
| Ethylene glycol | 5 | 5 | 9 | 9 |
| 2-Pyrrolidone | 2 | 4 | 5 | 2 |
| Triethanolamine | 0.9 | 0.5 | 0.9 | 0.9 |
| Triethylene glycol monobutyl ether | 6 | 6 | 5 | |
| 1,2-Hexanediol | | | | 3 |
| Surfynol 465 | 1 | 1 | 1 | 1 |
| Proxel GXL | 0.1 | 0.2 | 0.1 | 0.3 |
| EDTA | 0.02 | 0.02 | 0.02 | 0.02 |
| Purified water | Balance | Balance | Balance | Balance |

Comparative Examples 1 and 2

The procedure of Examples 1 to 4 was followed except that the components set forth in Table 2 below were used to obtain ink compositions of Comparative Examples 1 and 2.

TABLE 2

| | Comparative Example Nos. | |
|---|---|---|
| | 1 | 2 |
| Carbon black | 1.65 | 1.1 |
| C. I. Pigment Blue 15:3 | 1.65 | |
| C. I. Pigment Red 122 | 1.70 | |
| Water-soluble resin (dispersant) | | 0.3 |
| Diisooctyl phthalate | 0.5 | |
| Glycerin | 10 | 20 |
| Diethylene glycol | 30 | |
| Ethylene glycol | | 9 |
| 2-Pyrrolidone | | 2 |
| Triethylene glycol monobutyl ether | 7 | 5 |
| Surfynol 465 | 1 | 1 |
| Proxel GXL | 0.03 | 0.1 |
| EDTA | | 0.02 |
| Purified water | Balance | Balance |

Evaluation of Physical Properties (1) Printing Evaluation Test:

The ink compositions prepared in Examples 1 to 4 and Comparative Examples 1 and 2 were each then packed in a cartridge for an ink jet printer (PM-900C, produced by SEIKO EPSON CORPORATION).

Solid (duty: 100%) printing was effected at an output of 720×720 dpi. The printing was made on a recording medium for this printer (gloss film produced by SEIKO EPSON CORPORATION). The pattern thus outputted was then measured by a spectrophotometer (GRETAG SPM, produced by GRETAG INC.) to determine the coordinates in L*a*b* color specification system of color difference representation method defined in CIE. Referring to the measurement conditions, as the light source there was used D50. No light source filter was used. As a white color standard there was used absolute white. The angle of view was 2°. The saturation C* was determined by the following equation:

$$C^*=((a^*)^2+(b^*)^2)^{1/2}$$

The measurement results of color hue values are set forth in Table 3 below.

TABLE 3

| | L* | a* | b* | C* |
|---|---|---|---|---|
| Example 1 | 10.31 | 0.25 | −0.14 | 0.29 |
| Example 2 | 22.50 | 1.41 | 0.78 | 1.61 |
| Example 3 | 56.11 | −1.29 | 1.38 | 1.89 |
| Example 4 | 41.22 | 1.21 | 0.71 | 1.40 |
| Comparative Example 1 | 13.44 | −0.75 | 0.35 | 0.38 |
| Comparative Example 2 | 37.95 | 3.11 | 9.57 | 10.1 |

As can be seen in Table 3 above, the ink compositions of Examples 1 to 4 and Comparative Example 1 showed a* value and b* value each close to zero and a saturation C* in a level of about 3 or less demonstrating that they has a color hue of almost achromatic. Thus, an effect of the addition of complementary colors can be recognized.

On the contrary, the ink composition of Comparative Example 2 showed a great b* value (b* value indicates the yellowish tint of color hue), resulting in a great deviation from achromatic color, which is originally necessary.

(2) Ozone Resistance Evaluation:

The printed matter thus outputted was then evaluated for discoloration resistance using an ozone generator (Type OMS-H ozone weatherometer, produced by Suga Test Instruments Co., Ltd.).

For the evaluation of discoloration resistance, the printed matter was exposed for 3 hours in a tank which was controlled to an inner temperature of 40° C. and an ozone concentration of 200 ppm. The evaluation results were classified according to the following criteria and are set forth in Table 4.:

A: The color hue change ΔE between before and after exposure was less than 5;

B: The color hue change ΔE between before and after exposure was from not less than 5 to less than 10; and C: The color hue change ΔE between before and after exposure was not less than 10.

TABLE 4

| | Evaluation |
|---|---|
| Example 1 | A |
| Example 2 | A |
| Example 3 | A |
| Example 4 | A |
| Comparative Example 1 | C |
| Comparative Example 2 | A |

(3) Output of Gray Scale:

The ink compositions prepared in Examples 1 to 3 were each packed in a cartridge for an ink jet printer (MC2000C, produced by SEIKO EPSON CORPORATION) as follows.

(a) The ink composition of Example 1 was packed in the black ink chamber of MC2000C ink cartridge.

(b) The ink composition of Example 2 was packed in the cyan ink chamber of MC2000C ink cartridge.

(c) The ink composition of Example 3 was packed in the magenta ink chamber of MC2000C ink cartridge.

In operation, ejection was performed onto a recording medium for this printer (gloss film, produced by SEIKO EPSON CORPORATION) using only the ink compositions of Examples 1 to 3 so as to provide a gray gradation pattern from white to black (gray scale) outputted with dividing its gradation equally into 16 stages. The output was performed by properly distributing the amount of the various ink compositions to be ejected according to pattern data. The pattern thus outputted was then measured for color. The coordinates of a* and b* were then plotted. The results are set forth in FIG. 1.

Figure 2:
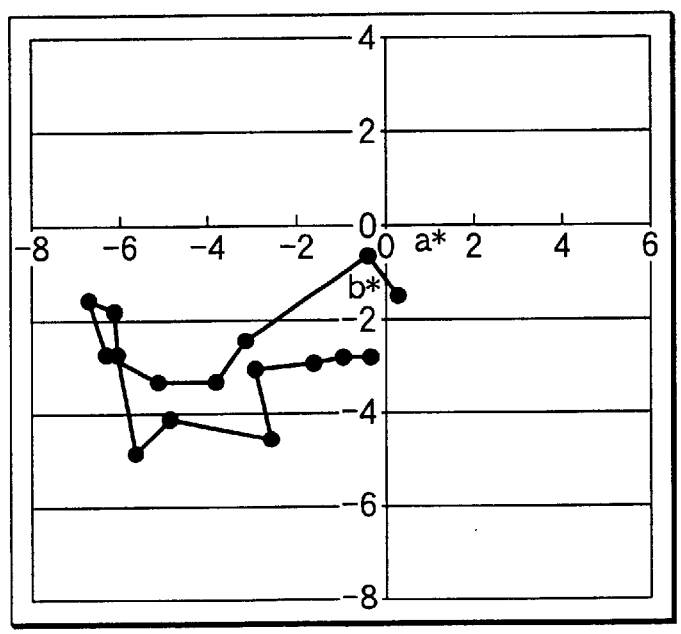
FIG. 2 is a graph showing the coordinates of a* and b* in the L*a*b* color specification system of the gray scale produced using a full color ink set for comparison.

On the other hand, for comparison, a pattern similar to that described above was outputted using the above-described ink jet printer MC2000C and its genuine ink set (a black ink, MC1BK01; and a color ink set (five colors), MC5CL01, each produced by SEIKO EPSON CORPORATION) through its printer driver genuinely mounted thereon. The pattern thus outputted was then measured for color. The coordinates of a* and b* were then plotted. The results are set forth in FIG. 2.

As can be seen in FIG. 1, when black ink composition of the invention was used, the results showed a curve close to the origin (a*=0; b*=0). In contrast, a color shift was recognized in FIG. 2 for comparison. Accordingly, the effect of addition of the blue pigment was confirmed. For reference, in FIGS. 1 and 2, the horizontal axis represents the coordinate of a* and the vertical axis represents the coordinate of b*.

In accordance with the invention, a black ink composition and an ink set which can modify the yellowing property of carbon black even stably with time can be provided.

While the invention has been described in detail and with reference to specific examples thereof, it will be apparent to one skilled in the art that various changes and modifications can be made therein without departing from the spirit and scope thereof.

What is claimed is:

1. A black ink composition comprising a carbon black and a pigment represented by the following general formula (1):

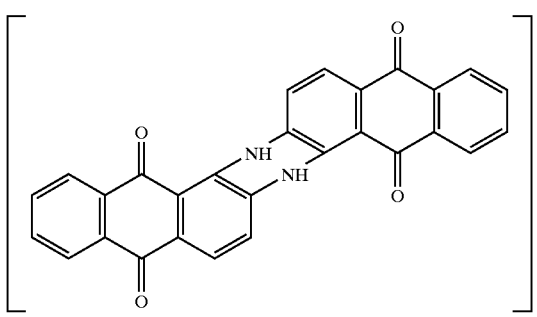

(1)

wherein p represents an integer of from 0 to 3.

2. The black ink composition according to claim 1 which is aqueous.

3. The black ink composition according to claim 1, further comprising at least one of an anionic surfactant, a nonionic surfactant and an amphoteric surfactant.

4. The black ink composition according to claim 3, wherein said nonionic surfactant is an acetylene glycol-based surfactant.

5. The black ink composition according to claim 1, further comprising a water-soluble organic solvent.

6. An ink set comprising, as a black ink composition or a light black ink composition, a black ink composition comprising a carbon black and a pigment represented by the following general formula (1):

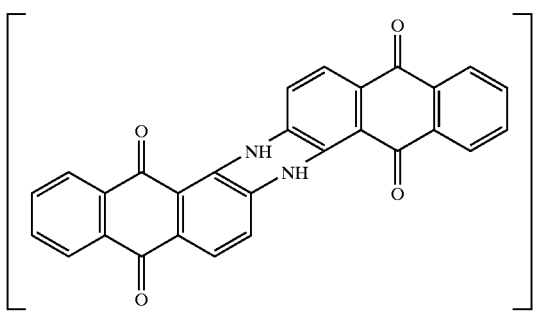

(1)

wherein p represents an integer of from 0 to 3.

7. An ink set comprising a plurality of black ink compositions comprising a carbon black and a pigment of formula (1):

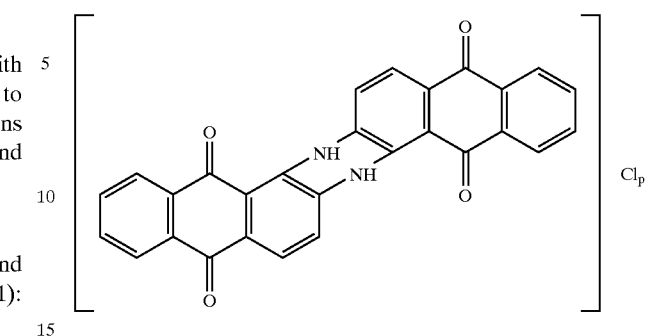

(1)

wherein the plurality of black ink compositions have different carbon black concentrations from one another, and wherein any two of the plurality of black ink compositions satisfy the following relationship (2):

$$P1/K1 > P2/K2 \qquad (2)$$

wherein P1 and K1 represent the concentrations of the pigment of formula (1) and of the carbon black, respectively, in the black ink composition having a lower carbon black concentration between the two black ink compositions, and P2 and K2 represent the concentrations of the pigment of formula (1) and of the carbon black, respectively, in the black ink composition having a higher carbon black concentration between the two black ink compositions.

8. The ink set according to claim 7, wherein said black ink compositions comprising a carbon black and a pigment of formula (1) include a light black ink composition and a black ink composition.

9. The ink set according to claim 6, which is aqueous.

10. A recording method comprising:
ejecting a droplet of an ink composition so that said droplet is attached to a recording medium to effect printing,
wherein said ink composition is a black ink composition according to claim 1.

11. Recorded matter obtained by printing in accordance with a recording method according to claim 10.

12. An ink jet recording device comprising an electrostrictive element capable of oscillating according to electrical signal and being arranged such that the oscillation of said electrostrictive element causes ejection of a black ink composition,
wherein said ink composition is a black ink composition according to claim 1.

13. A recording method comprising:
ejecting a droplet of an ink composition so that said droplet is attached to a recording medium to effect printing,
wherein said ink composition is a constituent of an ink set according to claim 6.

14. An ink jet recording device comprising an electrostrictive element capable of oscillating according to electrical signal and being arranged such that the oscillation of said electrostrictive element causes ejection of a black ink composition,
wherein said ink composition is a constituent of an ink set according to claim 6.

15. The black ink composition according to claim 1, wherein the ink composition consists of a plurality of constituents providing the composition with a black color and a plurality of other constituents, said constituents providing the composition with the black color consisting essentially of the carbon black and the pigment represented by formula (1); said pigment represented by formula (1) being present in the ink composition in an amount effective to increase a resistance of the carbon black to yellowing when the black ink composition is exposed to ambient atmosphere as compared with a resistance of the carbon black to yellowing when the ink composition contains, in addition to the carbon black, another pigment instead of the pigment represented by formula (1).

16. The black ink composition according to claim 15, wherein the pigment represented by formula (1) is present in the ink composition in an amount of 0.05 to 1.5 parts by weight per 1 part by weight of the carbon black.

17. The black ink composition according to claim 16, wherein the other constituents comprise water, a surfactant and a water-soluble organic solvent.

18. The black ink composition according to claim 17, wherein p=0.

* * * * *